United States Patent
Wesling et al.

(10) Patent No.: US 10,626,935 B2
(45) Date of Patent: Apr. 21, 2020

(54) BRAKE ROTOR

(71) Applicant: SRAM, LLC, Chicago, IL (US)

(72) Inventors: Kevin Wesling, Lombard, IL (US); Yenpang Liu, Taichung (TW); Charles Dunlap, Manitou Springs, CO (US)

(73) Assignee: SRAM, LLC, Chicago, IL (US)

( * ) Notice: Subject to any disclaimer, the term of this patent is extended or adjusted under 35 U.S.C. 154(b) by 18 days.

(21) Appl. No.: 15/481,049

(22) Filed: Apr. 6, 2017

(65) Prior Publication Data

US 2017/0299005 A1    Oct. 19, 2017

Related U.S. Application Data

(60) Provisional application No. 62/322,233, filed on Apr. 13, 2016.

(51) Int. Cl.
| | |
|---|---|
| *F16D 65/12* | (2006.01) |
| *B62L 1/00* | (2006.01) |
| *F16D 65/02* | (2006.01) |
| *B62L 3/02* | (2006.01) |
| *F16D 55/00* | (2006.01) |
| *F16D 69/00* | (2006.01) |

(52) U.S. Cl.
CPC ............ *F16D 65/123* (2013.01); *B62L 1/005* (2013.01); *B62L 1/00* (2013.01); *B62L 3/023* (2013.01); *F16D 65/12* (2013.01); *F16D 2055/0062* (2013.01); *F16D 2065/1304* (2013.01); *F16D 2069/004* (2013.01); *F16D 2250/003* (2013.01); *F16D 2250/0023* (2013.01)

(58) Field of Classification Search
CPC .................. F16D 65/12; F16D 65/123; F16D 2055/0062; F16D 2065/026; F16D 2065/1304; F16D 2069/004; F16D 2250/0023; F16D 2250/003
USPC ............................................. 188/26, 218 XL
See application file for complete search history.

(56) References Cited

U.S. PATENT DOCUMENTS

| | | |
|---|---|---|
| 2,191,460 A | 2/1940 | Fisher |
| 3,301,356 A | 1/1967 | Pompa |

(Continued)

FOREIGN PATENT DOCUMENTS

| | | |
|---|---|---|
| DE | 2218376 A1 | 11/1972 |
| EP | 0762006 A1 | 3/1997 |

(Continued)

OTHER PUBLICATIONS

HopeTech.com, Road Rotor, Jan. 18 2017, https://web.archive.org/web/20170118130000/http://www.hopetech.conn/product/road-rotor#tech.*

(Continued)

*Primary Examiner* — Thomas W Irvin

(57) ABSTRACT

A brake rotor has a circumferential brake track disposed about an axis of rotation of the brake rotor. The rotor has an outer peripheral edge circumferentially around the brake rotor. The rotor has two surfaces that face axially outward away from one another and that are on axially opposed sides of the brake rotor. The two surfaces define a thickness therebetween. The rotor has an edge surface facing radially outward on the outer peripheral edge. The rotor has a transition between each of the two surfaces and the edge surface. At least a portion of the edge surface is not perpendicular to the two surfaces in an axial direction.

22 Claims, 7 Drawing Sheets

(56) References Cited

U.S. PATENT DOCUMENTS

| | | | |
|---|---|---|---|
| 3,435,924 A | 4/1969 | Beuchle | |
| 3,621,945 A | 11/1971 | Spry | |
| 3,850,267 A | 11/1974 | Odier | |
| 4,077,501 A | 3/1978 | Morris | |
| 4,093,043 A | 6/1978 | Smith | |
| 4,273,218 A | 6/1981 | Morris et al. | |
| 4,848,521 A | 7/1989 | Izumine | |
| 4,913,267 A | 4/1990 | Campbell et al. | |
| 5,224,572 A | 7/1993 | Smolen, Jr. et al. | |
| 5,273,140 A | 12/1993 | Berwanger | |
| 5,632,362 A | 5/1997 | Leitner | |
| 5,848,674 A * | 12/1998 | Johnson | B62L 1/00 188/18 A |
| D413,092 S * | 8/1999 | Johnson | D12/180 |
| D413,093 S * | 8/1999 | Johnson | D12/180 |
| 6,135,248 A * | 10/2000 | Johnson | B62L 1/00 188/18 A |
| 6,244,393 B1 | 6/2001 | Weidenweber et al. | |
| 6,340,074 B1 * | 1/2002 | Lumpkin | F16D 65/18 188/26 |
| 6,347,689 B1 | 2/2002 | Ohishi | |
| D651,145 S * | 12/2011 | Lockrem | D12/180 |
| 8,250,898 B2 * | 8/2012 | Takenaka | F16D 65/12 72/340 |
| D721,309 S * | 1/2015 | Moore | D12/180 |
| 9,752,633 B2 * | 9/2017 | Nakakura | F16D 65/128 |
| 2003/0107185 A1 | 6/2003 | Matsuki | |
| 2005/0056495 A1 * | 3/2005 | Greppi | F16D 65/12 188/26 |
| 2005/0173215 A1 | 8/2005 | Watarai et al. | |
| 2007/0102247 A1 | 5/2007 | Takenaka et al. | |
| 2013/0025985 A1 | 1/2013 | Takagi et al. | |
| 2015/0360744 A1 * | 12/2015 | Noborio | B62L 1/005 188/26 |
| 2016/0025164 A1 * | 1/2016 | Watarai | F16D 65/12 188/218 XL |
| 2017/0108064 A1 * | 4/2017 | Lisciani | F16D 65/123 |
| 2017/0204921 A1 * | 7/2017 | Nakakura | F16D 65/123 |

FOREIGN PATENT DOCUMENTS

| | | |
|---|---|---|
| EP | 1167807 A2 | 1/2002 |
| EP | 3163112 A1 | 5/2017 |
| FR | 2218507 A | 9/1974 |
| GB | 1512778 A | 6/1978 |
| GB | 2129878 A | 5/1984 |
| JP | S50109088 U | 9/1975 |
| JP | H0642562 A | 2/1994 |
| JP | H06249275 A | 9/1994 |
| JP | H07253128 A | 10/1995 |
| JP | H07301264 A | 11/1995 |
| JP | H0972361 | 3/1997 |
| JP | H10325432 | 12/1998 |
| JP | H11280805 A | 10/1999 |

OTHER PUBLICATIONS

Bikerumor.com, "Rounded rotors to the rescue! UCI allows disc brakes back in pro peloton in 2017", Tyler Benedict, Sep. 8 2016, https://web.archive.org/web/20160910141228/https://bikerumor.com/2016/09/08/rounded-rotors-rescue-uci-allows-disc-brakes-back-pro-peloton-2017/.*

Road.CC, "Eurobike 2016 : Hope show new road calipers and hubs", VecchioJo, Sep. 7 2016, https://web.archive.org/web/20160907142915/https://road.cc/content/tech-news/203735-eurobike-2016-hope-show-new-road-calipers-and-hubs.*

BikeRumor.com, "Rounded Rotors: How Shimano is satisfying the UCI & Pro peloton", Cory Benson, Jan. 24, 2017, https://web.archive.org/web/20170321163407/https://www.bikerumor.com/2017/01/24/rounded-rotors-shimano-satisfying-uci-pro-peloton/.*

* cited by examiner

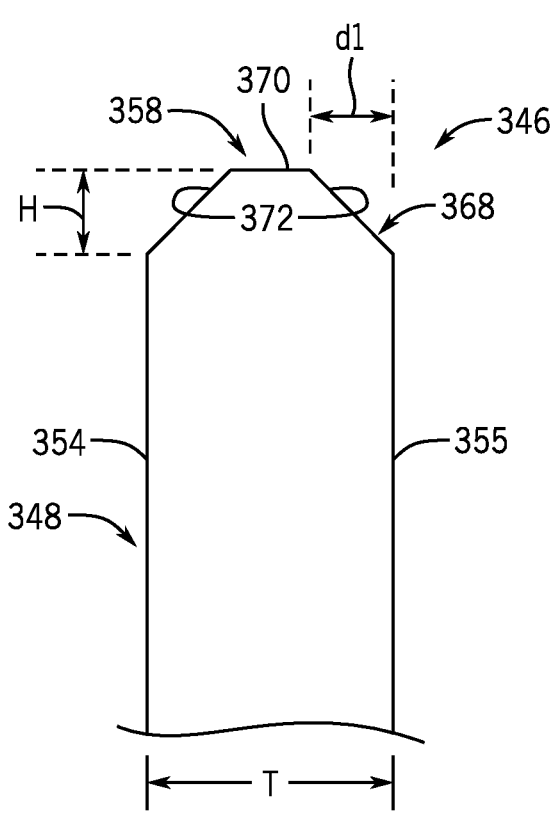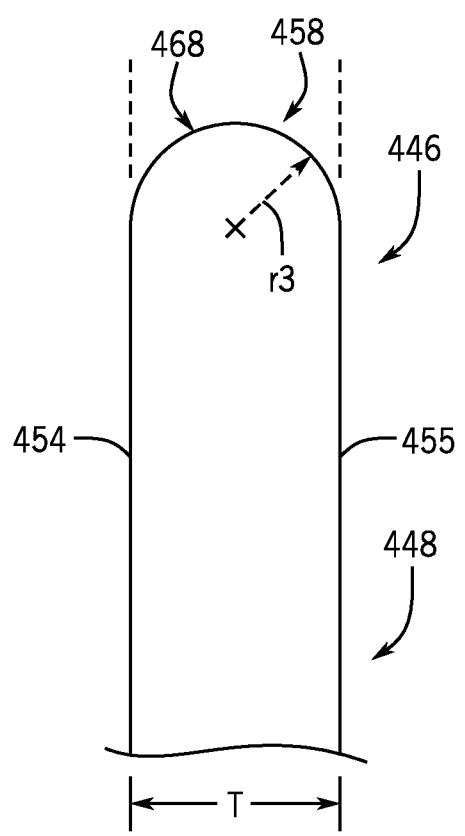
FIG. 7  FIG. 8
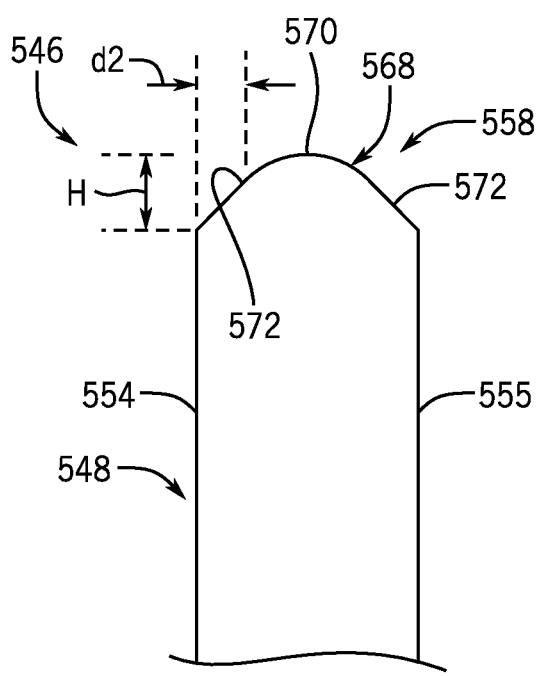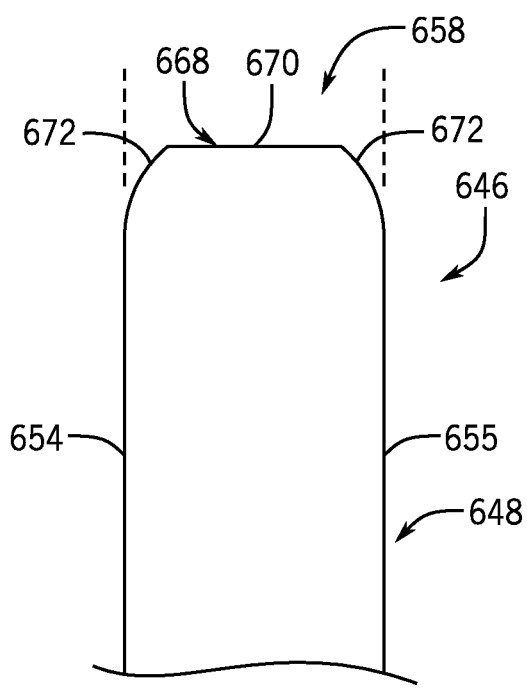
FIG. 9  FIG. 10

BRAKE ROTOR

RELATED APPLICATION DATA

This application is related to and claims the priority benefit of U.S. Provisional Application Ser. No. 62/322,233 filed on Apr. 13, 2016 and entitled "Brake Rotor." The entire contents of this prior filed application are hereby incorporated herein by reference.

BACKGROUND

1. Field of the Disclosure

This application generally relates to a brake rotors, and more particularly to a brake rotor having a shaped peripheral surface or edge profile.

2. Description of Related Art

Disc brakes are well known for use on two-wheeled vehicles. Some disc brakes are also known for use specifically on bicycles. The typical disc brake system has a disc shaped brake rotor on the front wheel and/or the rear wheel of the vehicle. The typical brake rotor has a circumferential brake track with a braking portion or friction region extending around the brake track. The disc brake system also has a brake caliper with brake pads on the front wheel and the rear wheel. The brake pads, when the caliper is actuated, contact the braking portion or friction region of the brake rotor to slow the bicycle or vehicle.

The brake rotors on bicycles are mounted for rotation about the wheel axles and are typically exposed on a side of the front wheel and/or the rear wheel. Thus, the periphery of each of the brake rotors is uncovered and exposed. The conventional bicycle brake rotor has an exposed peripheral edge that is substantially squared off in the axial direction. The peripheral edge has an edge surface that is perpendicular to the two faces of the disc shaped body of the brake rotor. In other words, the edge surface is parallel to the rotation axis of the brake rotor. The transition between each of the two faces of the brake rotor and the edge surface often includes an edge with a dramatic angular transition resulting in a relatively sharp angular change corner with little to no radius.

SUMMARY

Accordingly, there is a need for an improved brake rotor design that can reduce or minimize the dramatic angular transition of the peripheral edge of a brake rotor. In one example, according to the teachings of the present disclosure, a circumferential brake track is disposed about an axis of rotation of the brake rotor. The circumferential brake track comprising a first surface and a second surface that face axially outward away from one another and that are on axially opposed sides of the brake rotor, the two surfaces defining a thickness therebetween. The brake rotor also includes an outer peripheral edge circumferentially around the brake rotor. The outer peripheral edge includes an edge surface facing radially outward on the outer peripheral edge, and a transition between each of the two surfaces and the edge surface. In an embodiment, at least a portion of the transition of the outer peripheral edge is not perpendicular to the two surfaces in an axial direction of the brake rotor. For example, the transition may include a curve and/or be rounded.

In one example, the brake rotor can include a plurality of support members and a mounting section. The support members can extend between and connect the mounting section and the brake track to one another.

In one example, the brake rotor can be substantially flat.

In one example, the brake rotor can have a diameter. A ratio of the diameter to the thickness can be between 48 and 140.

In one example, the brake track can have a width in a radial direction relative to the axis of rotation of between 10 mm and 18 mm.

In one example, the brake track can be the radially outermost part of the brake rotor. The two surfaces can be the opposed axial sides on the brake track. The peripheral edge can be on a radially outermost portion of the brake track.

In one example, the portion of the transition of the outer peripheral edge can include a curved section in the axial direction.

In one example, the portion of the transition of the outer peripheral edge can include a chamfer in the axial direction.

In one example, the edge surface can be rounded or curved in the axial direction between the two surfaces.

In one example, the edge surface can be rounded or curved in the axial direction and the rounded or curved edge surface can have a constant radius.

In one example, the edge surface can be rounded or curved in the axial direction and the rounded or curved edge surface can have a constant radius that can be half the thickness between the two surfaces.

In one example, the edge surface can be rounded or curved in the axial direction and the rounded or curved edge surface can have a constant radius that can be greater than half the thickness between the two surfaces.

In one example, the edge surface can include a central section disposed between two flanking sections in the axial direction. Either the central section or the two flanking sections can comprise the first portion of the edge surface.

In one example, the edge surface can include a central flat section between two flanking curved sections in the axial direction.

In one example, the edge surface can include a central flat section between two flanking curved sections in the axial direction. The curved sections can be constructed and arranged so that tangents thereto at each of the transitions are parallel to the two surfaces.

In one example, the edge surface can include a central curved section between two flanking chamfers in the axial direction.

In one example, the edge surface can include a central curved section between two flanking chamfers in the axial direction. The transitions are between the two flanking chamfers and the two surfaces and can be rounded.

In one example, the edge surface can include a central flat section between two flanking chamfers in the axial direction.

In one example, the edge surface can include a central flat section between two flanking chamfers in the axial direction. The transitions are between the two flanking chamfers and the two surfaces and can be rounded.

In one example, the edge surface can include a central flat section between two flanking chamfers in the axial direction. The transitions are between the two flanking chamfers and the two surfaces. The edge surface can include additional transitions between the central flat section and the flanking chamfers. The additional transitions can be rounded.

In one example the outer peripheral edge can be non-circular.

In one example, the outer peripheral edge can include one or more notches or depressions formed therein. The notches or depressions can each have a contour that can be non-concentric with the axis of rotation.

In one example, a method of manufacturing a brake rotor involves orienting an unfinished brake rotor relative to a material removal device, and removing material at a peripheral edge of the unfinished brake rotor to form a transition between a peripheral edge surface and a friction surface of the brake rotor that is not perpendicular to the friction surface.

BRIEF DESCRIPTION OF THE DRAWINGS

Objects, features, and advantages of the present invention will become apparent upon reading the following description in conjunction with the drawing figures, in which:

FIG. 7 is an enlarged cross-section view of another example of a peripheral surface profile for a brake rotor constructed in accordance with the teachings of the present disclosure.

FIG. 8 is an enlarged cross-section view of another example of a peripheral surface profile for a brake rotor constructed in accordance with the teachings of the present disclosure.

FIG. 9 is an enlarged cross-section view of another example of a peripheral surface profile for a brake rotor constructed in accordance with the teachings of the present disclosure.

FIG. 10 is an enlarged cross-section view of another example of a peripheral surface profile for a brake rotor constructed in accordance with the teachings of the present disclosure.

DETAILED DESCRIPTION OF THE DISCLOSURE

The present disclosure is for a brake rotor having a shaped peripheral surface or peripheral edge profile. The disclosed brake rotors include a peripheral edge that has a shaped contour. The shaped contour is in the axial direction on the brake rotor relative to an axis of rotation of the brake rotor. The disclosed brake rotors include a peripheral edge that is configured to eliminate or substantially reduce the degree of any sharp angular transition corners or transitions between an edge surface of the peripheral edge and surfaces on the opposed faces of a brake rotor.

The disclosed brake rotors solve or improve upon one or more of the above noted and/or other problems and disadvantages with prior known brake rotors. The disclosed brake rotors provide a peripheral edge having a surface contour or edge surface profile that reduces or eliminates any sharp angular transition edges or corners. Several examples of possible surface contours or peripheral edge profiles are disclosed and described herein. These and other objects, features, and advantages of the disclosed brake rotors will become apparent to those having ordinary skill in the art upon reading this disclosure.

Figure 1:
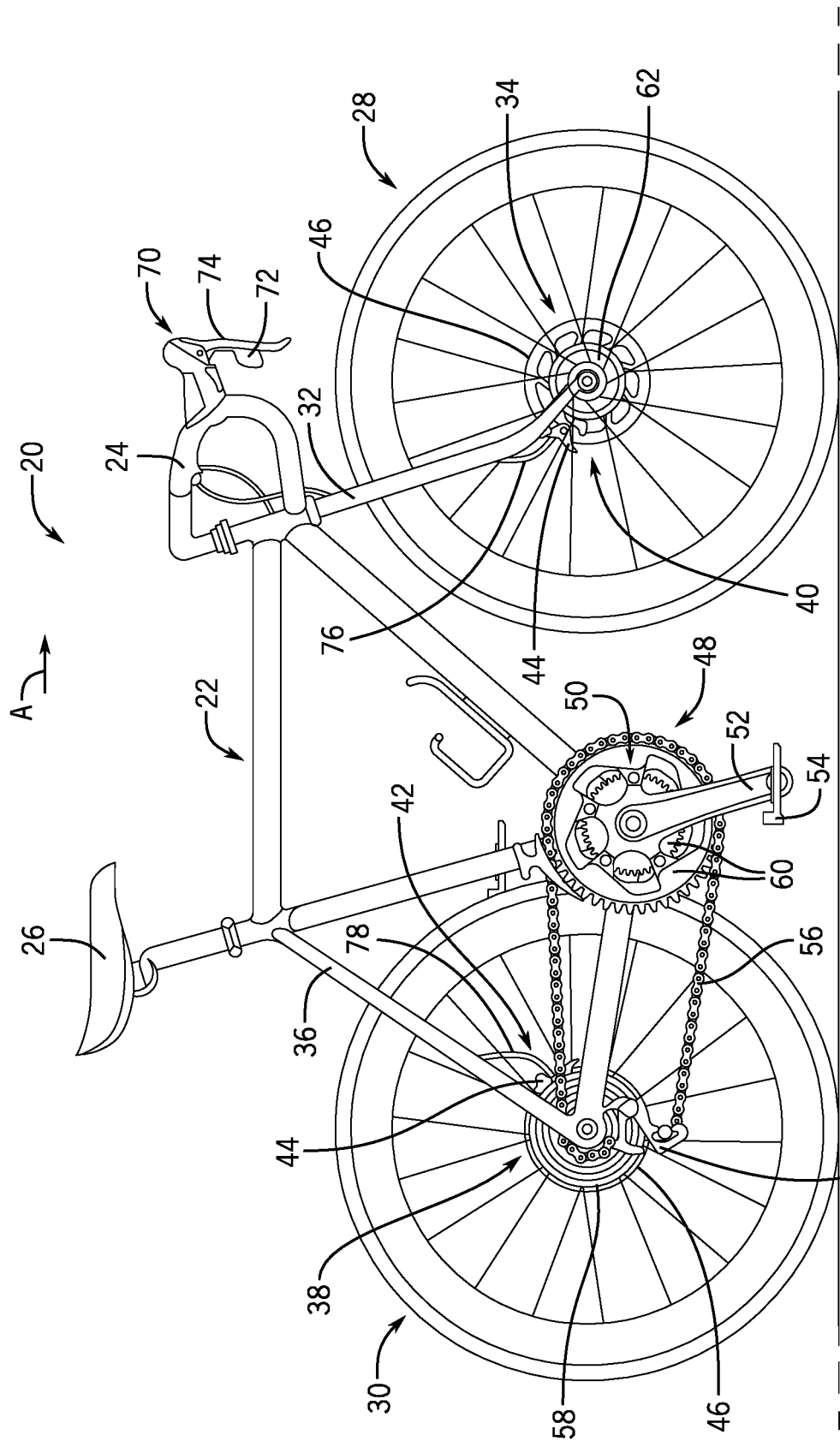
FIG. 1 is a side view of one example of a bicycle for which the disclosed brake rotors are suited.

Turning now to the drawings, FIG. 1 illustrates one example of a two-wheeled vehicle on which the disclosed brake rotors may be implemented. In this example, the two-wheeled vehicle is one example of bicycle 20, shown in the form of a road bicycle. The bicycle 20 has a frame 22, a handlebar 24 near a front end of the frame, and a height adjustable seat 26 for supporting a rider over a top of the frame. The bicycle 20 also has a first or front wheel 28 supporting the front end of the frame 22 and a second or rear wheel 30 supporting a rear end of the frame. The front wheel 28 is rotatably coupled to a front fork 32 of the frame 22 via a front hub assembly 34. The handlebar 24 is coupled to the front fork 32 for turning the front wheel 28. The rear wheel 30 is rotatably coupled to a rear fork 36 of the frame 22 via a rear hub assembly 38.

The bicycle 20 also has a front disc brake assembly 40 and rear disc brake assembly 42. The front disc brake assembly 40 slows the rotation of the front wheel 28 and the rear disc brake assembly 42 slows the rotation of the rear wheel 30. Each of the disc brake assemblies 40, 42 include a caliper 44 connected to a disc brake rotor 46 mounted to the corresponding front or rear hub assembly 34, 38. Aspects of the disc brake rotors 46 (hereinafter "brake rotor" or "brake rotors") are discussed further below in accordance with the teachings of the present disclosure. The reference character 46 is used herein to generically identify the brake rotors 46 shown on the bicycle 20 in FIG. 1. However, the reference character 46 is also used to refer generally to all of the brake rotor examples and embodiments disclosed and described herein. Each specific embodiment of the brake rotors 46 is identified hereinafter as a brake rotor 146, 246, 346, et. seq. herein.

The bicycle 20 also has a drive train 48 with a crank assembly 50 including a pair of crank arms 52 and a pedal 54 at the end of each crank arm. The crank assembly 50 is operatively coupled via a chain 56 to a rear cassette 58, which has a plurality of rear sprockets, and which is mounted adjacent the rotation axis of the rear wheel 30. The drivetrain 48 also includes a plurality of front sprockets 60 driven by the crank assembly 50. The plurality of front sprockets 60 may be rotatably coupled to the frame 22 via a bottom bracket (not shown). The rear cassette 58 is coupled to the rear hub assembly 38 of the rear wheel 30. A front gear change mechanism 62, such as a front derailleur, which may be mechanically or electrically controlled, is provided to shift the chain 56 between the plurality of front sprockets 60. A rear gear change mechanism 64, such as a rear derailleur, which may also be mechanically or electrically controlled, is provided to shift the chain 56 between the plurality of rear sprockets of the rear cassette 58.

While the illustrated bicycle 20 is a road bike having drop-style a handlebar 24, the present disclosure is applicable to bicycles of any type, including fully or partially suspensioned mountain bikes and others, as well as bicycles with mechanically controlled (e.g. cable, hydraulic, pneumatic) and non-mechanical controlled (e.g. wired, wireless) drive systems. The disclosed brake rotors 46 may also be implemented on other types of two-wheeled vehicles as well.

In the illustrated example, a first control device 70 and a second control device (not shown) may be mounted on the handlebar 24 to operate or control the drivetrain 48 and the front and rear disc brake assemblies 40, 42. Each of the control devices may include a shift lever and a brake lever. Thus, in this example, the first control device 70 can have a first or front shift lever 72 and a first or front brake lever 74. The first control device 70 may control or operate the front derailleur 62 and the front disc brake assembly 40. The second control device may control or operate the rear derailleur 64 and the rear disc brake assembly 42. Alternatively, the shift and brake levers may be distinct and different components mounted separately to the handlebar 24. The bicycle may also include one or more additional control devices to operate or control other features of the bicycle, such as a dropper post, adjustable suspension components, or the like.

The bicycle 20 of FIG. 1 may have a hydraulic brake system. In such an example, the first brake lever 74 is hydraulically coupled to the front brake caliper 44 via a first hydraulic brake line 76. The second brake lever (not shown) is hydraulically coupled to the rear brake caliper 44 via a second hydraulic brake line 78. In other embodiments, the hydraulic brake system may include one or more additional and/or alternative components and/or may be configured in other ways. Additionally, the hydraulic brake system may be replaced by a different type of brake system, such as a non-hydraulic brake system using mechanical brake cables, wires, or the like or such as a non-mechanical brake system utilizing electronic or wireless components. Such non-hydraulic brake systems may also use a brake rotor configured as described herein.

In this example, each of the front and rear brake rotors 46 can be constructed according to the teachings of the present disclosure, as described in more detail below. When the first brake lever 74 is actuated, brake fluid flows within the front brake line 76 to the front brake caliper 44 and actuates brake pads carried by the caliper. The pads, though not shown herein, are in contact with a portion of the front brake rotor 46. Friction between the brake pads and the brake rotor 46 acts to slow rotation of and thus brake the front wheel 28. Likewise, when the second brake lever is actuated, brake fluid flows within the rear brake line 78 to the rear brake caliper 44 and actuates brake pads carried by the caliper. The pads are in contact with a portion of the rear brake rotor 46 and friction between the brake pads and the brake rotor acts to slow rotation of and thus brake the rear wheel 30.

The disclosed brake rotors 46 are configured to have a modified peripheral edge shape or contour, as described in more detail below. The front and rear brake rotors 46 may be of the exact same size on the bicycle 20 or the two brake rotors may be of a different size. It is possible that the front and rear brake rotors 46 have an identical construction on the bicycle 20. However, it is also possible that the front and rear brake rotors 46 have different constructions and/or that only one of the brake rotors, such as the front brake rotor, is constructed according to the teachings of the present disclosure. In the description below, only the front brake rotor 46 (and front brake rotors 146, 246, 346, et. seq.) is described in detail. The description may, however, be equally applicable to the rear brake rotor 46 as well, though not mentioned after this point herein. Further, the brake rotors 46 may be provided in a variant where the brake track of the rotor is a separate piece from the support members and the two (or more) components are either loosely or rigidly joined to transfer torque from the brake track to the support members and mounting section during braking. The brake rotor may also be part of a rotor assembly, including additional components, such as a separate carrier or mounting section and/or a separate heat sink section. Though in the disclosed embodiments, the brake rotors are a unitary construction, the embodiments described herein may also include such rotor variants including multiple components.

It is to be understood that the specific arrangement and illustrated components of the frame, the front and rear wheels, the drivetrain, the front and rear disc brake assemblies, the seat, and the handlebar are intended to be non-limiting. The disclosure may be implemented on cycles that vary from the disclosed specific components and arrangements. For example, the style of the handlebar may be bullhorn, flat, riser, or the like. Further, various terms relating to direction may be used herein. For example, the terms "inboard" and "outboard" or "inner" and "outer" or "inside" and "outside" may be used herein. These terms may be used to differentiate one side of the bicycle from another or one side or end of a component from another on the bicycle. Herein, these terms may be used as identifying locations on opposite sides of a vertical plane that substantially bisects the bicycle or directions toward or away from the vertical plane, or may be used otherwise.

Further, the front and/or forward orientation of the bicycle 20 is indicated by the direction of the arrow "A" in FIG. 1. Thus, a forward direction of movement for the bicycle 20 is indicated by the direction of the arrow A.

The disclosed brake rotors generally include a brake track disposed about the axis of rotation of the brake rotor, for example a circumferential brake track that is concentric with and circumvents the axis of rotation of the brake rotor. The brake rotor has an outer peripheral edge that extends circumferentially around the brake rotor. The brake rotor has two surfaces that face axially outward away from one another and that are on axially opposed sides of the brake rotor. The two surfaces define a thickness of the brake rotor therebetween. The brake rotor has an edge surface facing radially outward on the outer peripheral edge. The brake rotor has a transition between each of the two surfaces and the edge surface. At least a first portion of the edge surface and/or one or more of the transitions is not perpendicular to the two surfaces in an axial direction. This shaping or contouring feature of the edge surface and/or one or more of the transitions in the axial direction achieves the objects and advantages of the invention.

Figure 2:
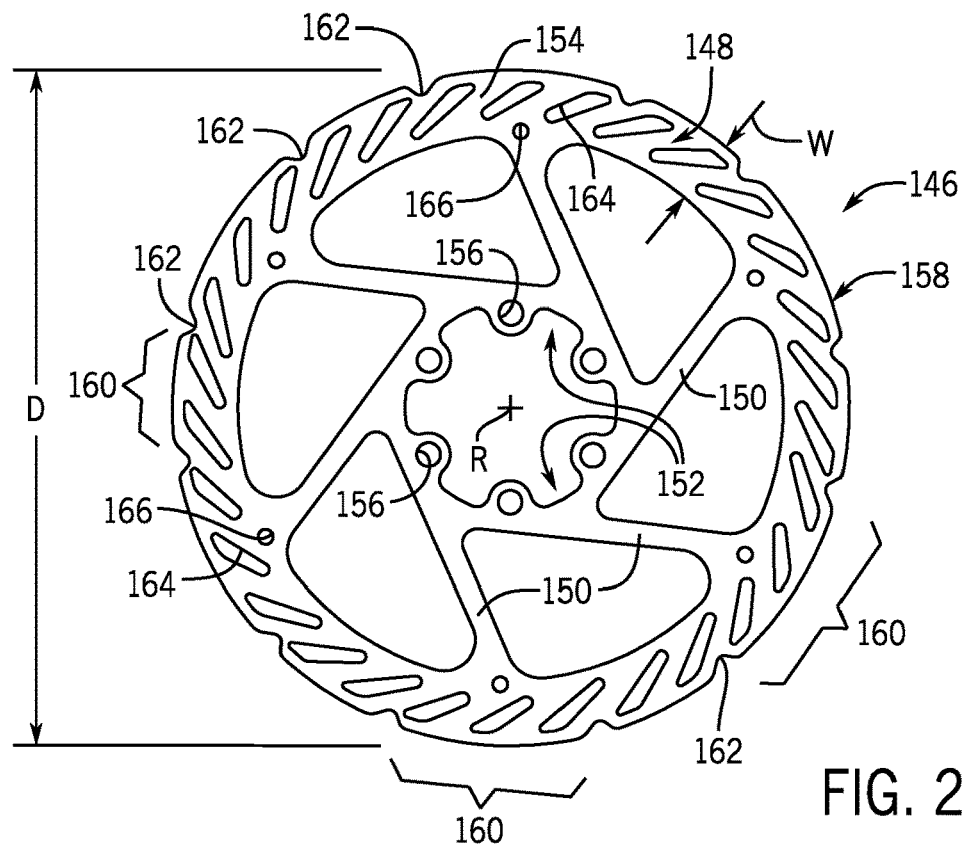
FIG. 2 is a side view of one example of a brake rotor, which may be constructed in accordance with the teachings of the present disclosure.

FIG. 2 shows one example of a brake rotor 146, which may also be a bicycle disk brake rotor for the bicycle 20 described above. The brake rotor 146 generally includes a friction section or brake track 148, a plurality of support members 150, and a mounting section 152. The brake track 148 in this embodiment is the radially outermost section of the brake rotor 146. The brake rotor 146 has two opposed sides and a thickness in the axial direction relative to a rotation axis R of the brake rotor. Thus, the brake track 148 also has two opposed friction surfaces 154. The brake track 148 may be described as being carried or supported by the support members 150. The brake rotor 146 in this embodiment has six of the support members 150. The support members 150 extend generally in a radial direction between the brake track and the mounting section, but are oriented at an angle relative to a direct radial direction. The support members 150 are connected at one end to the brake track 148 and at the other end to the radially inner mounting section 152. The mounting section 152 is typically configured to mount the brake rotor 146 to a bicycle wheel or wheel hub, such as the front wheel hub assembly 34 on the bicycle 20. The mounting section 152 can thus include a plurality of mounting holes 156, and in this embodiment has six mounting holes.

The peripheral edge of a brake rotor may be circular or non-circular. In an embodiment, the peripheral edge may include features resulting in eccentricities and/or abnormalities providing for the non-circularity of the peripheral edge. For example, as shown in FIG. 2, the brake track 148 of the brake rotor 146, in plan view perpendicular to the rotation axis R, terminates at a radially outward facing peripheral edge 158. The peripheral edge 158 in this embodiment has an intermittent circular shape including circular segments 160 that are a constant radial distance from and concentric with the rotation axis R. The peripheral edge 158 also includes a plurality of features, which in this embodiment are notches or cutouts 162, that are interspersed or spaced apart around the peripheral edge. These cutouts 162 result in the peripheral edge 158 having portions at these locations that are concentric with the axis R, or that are at a lesser radial distance from the axis R than the circular segments 160. Thus, the peripheral edge 158 has a non-circular circumferential shape.

As described further below with respect to further embodiments and examples, the peripheral edge 158 of the brake rotor 146 may have a radially outermost, or peripheral edge surface that is shaped or contoured in the axial direction in accordance with the teachings of the present disclosure. For example, the peripheral edge surface may include at least one curve between the opposed friction surfaces 154 of the brake track. The shaped peripheral edge surface may be a rounded or partially rounded shape, or may be a non-round shape. Also, the opposed friction surfaces as described herein may be mirrored surfaces with the same or similar features, or they may be surfaces with different features and/or characteristics.

The typical brake rotor for bicycles may have a diameter D, such as across two opposed circular segments 160 on the brake rotor 146. In one example the diameter can be between about 120 millimeters ("mm") and about 210 mm. The typical bicycle brake rotor may also have a thickness T in the axial direction between the opposed faces, such as between the sides on the brake rotor 146. In one example, the thickness may be between about 1.5 mm and about 2.5 mm. The typical brake rotor may also have a brake track width W, measured in the radial direction, such as relative to the axis R on the brake track 148 on the brake rotor 146. In one example, the brake track width can be between about 10 mm and about 18 mm in the radial direction. Thus, in an embodiment, the ratio of the diameter of the brake rotor divided by the thickness of the brake rotor can be between about 80 and about 90. However, this ratio range may be between about 48 (120 mm/2.5 mm) and about 140 (210 mm/1.5 mm). Further, in an embodiment, the ratio of the diameter of the brake rotor divided by the thickness of the brake rotor, and further divided by the brake track width, can be between about 5 and 6. However, this ratio range can be between about 2.6 (48 mm/18 mm) and 14 (140 mm/10 mm).

In view of the foregoing, and as will become evident to those having ordinary skill in the art, aspects of the brake rotors 46 can vary within the spirit and scope of the disclosure. For example, using the brake rotor 146 of FIG. 2 for illustration, the brake track width W, the brake rotor thickness T, and the brake rotor diameter D can vary. The shape of the peripheral edge 158, such as the circular segments 160 and the cutouts 162, in the radial direction can also vary. The material used to fabricate the brake rotor 146 can also be varied, though various grades and alloys of steel are common materials. The size and shape of the mounting section 152, the number of mounting holes 156, the size and shape of the openings between the support members 150, and the length, width, and number of the support members can also vary. Because the brake rotors may expand and contract as they heat and cool during use, the orientation of the support members 150 may also vary to accommodate and/or help facilitate such expansion and contraction. Further, slots 164, holes 166, and the like can be provided through the brake rotor, such as the rough the brake track 148. These types of features can be configured and provided to help dissipate heat from the brake rotor 146 as well as to reduce weight and material usage.

Figure 5:
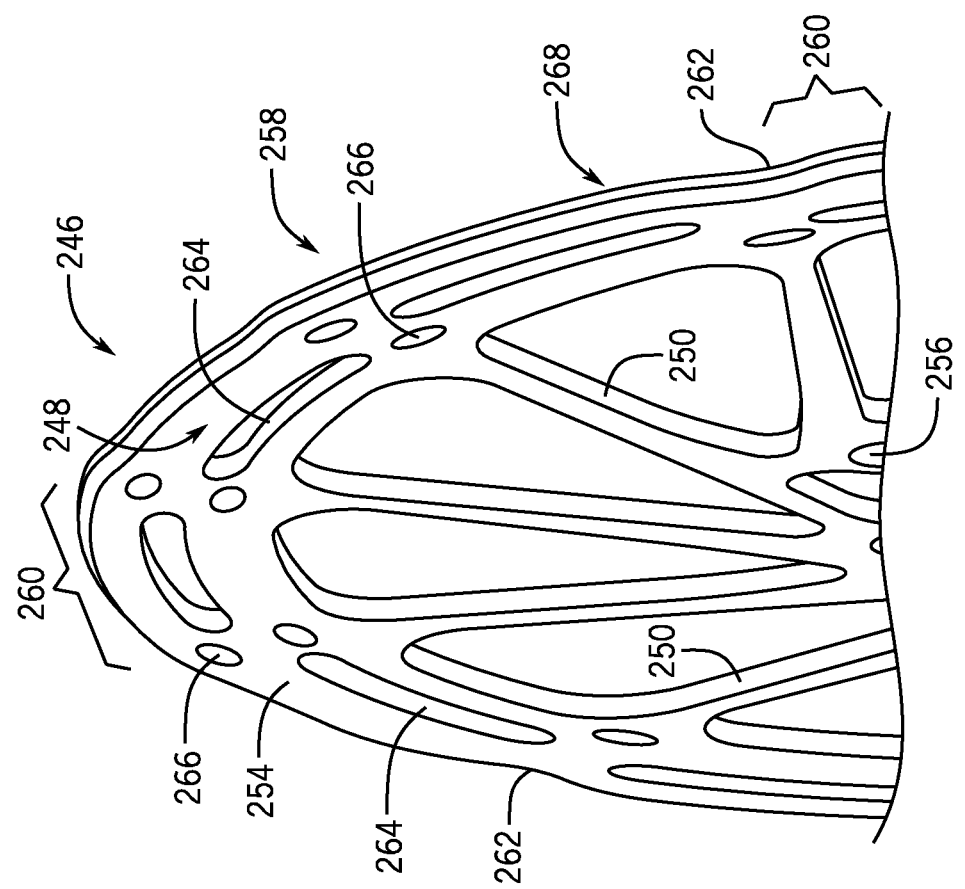
FIG. 5 is an enlarged segment of the brake rotor of FIG. 4.
Figure 4:
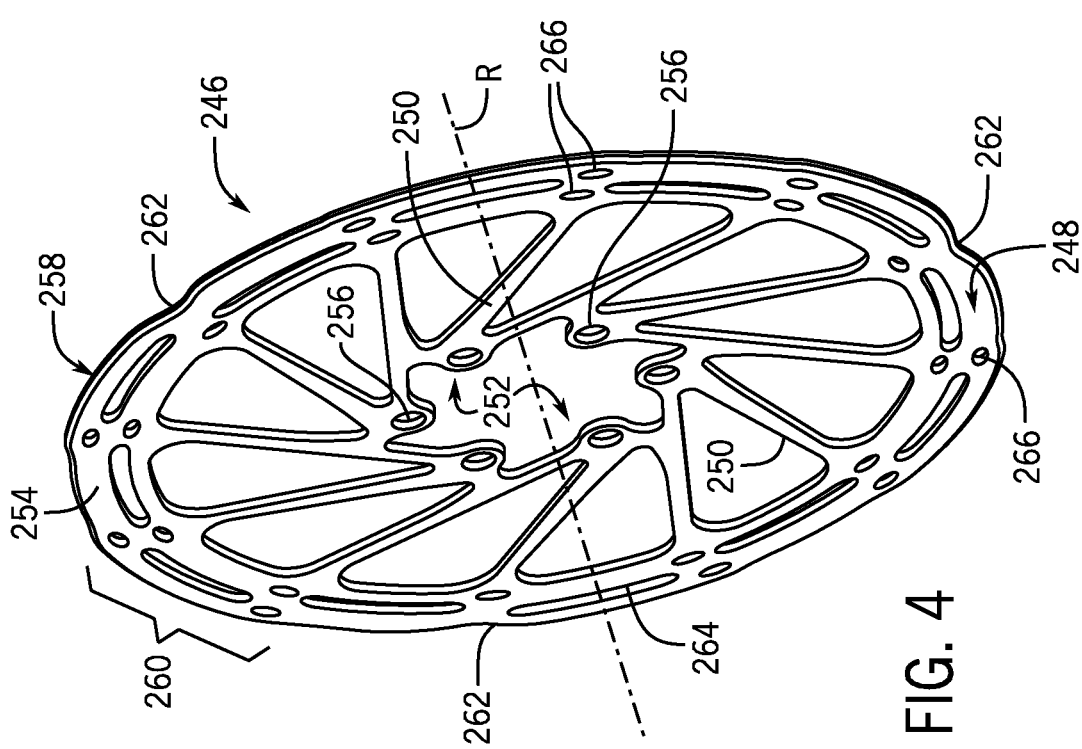
FIG. 4 is a perspective view of the brake rotor of FIG. 3.
Figure 6A:
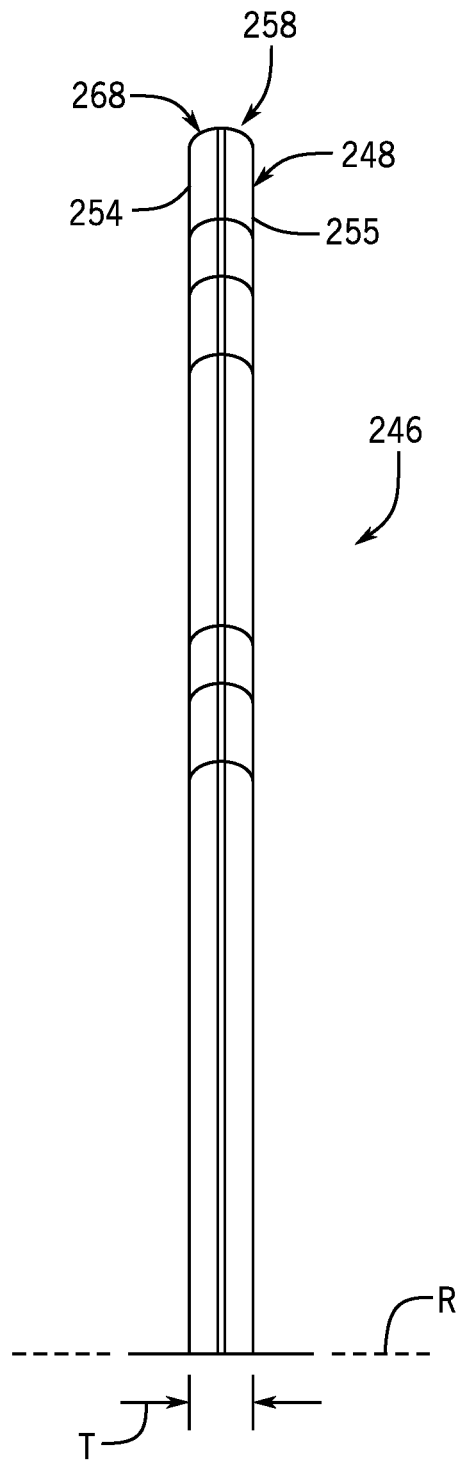
FIG. 6A is an end or edge view of the brake rotor segment of FIG. 5 and depicting one example of a peripheral surface profile.

FIGS. 3-6A show another embodiment of a brake rotor 246. The brake rotor 246 generally includes a radially outermost brake track 248 and a plurality of support members 250. Each support member 250 has an end connected to the brake track and an opposite end connected to a central mounting section 252. The brake rotor 246 has two opposed sides, as depicted in FIG. 6A, and a thickness T in the axial direction relative to a rotation axis R of the brake rotor. Thus, the brake track 248 also has two opposed friction surfaces 254, 255 which are used herein to define the thickness T. The brake track 248 is again carried or supported by the support members 250. The brake rotor 246 in this embodiment has twelve of the support members 250. The mounting section 252 may again be configured to mount the brake rotor 246 to a bicycle wheel or wheel hub, such as the front wheel hub assembly 34 on the bicycle 20. The mounting section 252 thus again includes six mounting holes 256 for attaching the brake rotor to a wheel hub.

The brake rotor 246 in this example has more (twelve) support members 250 and has a different brake track 248 shape. The number of the support members can be any number needed to structurally support the brake track. The number may depend on the size of the support members as well as the diameter of the brake rotor and the orientation angle of the support members, among other factors.

Referring again to FIGS. 3-6A, the brake rotor 246 or brake track 248 also has a radially outermost, or peripheral, edge 258. In this embodiment, the peripheral edge 258 is not circular relative to the rotation axis R of the brake rotor.

Figure 3:
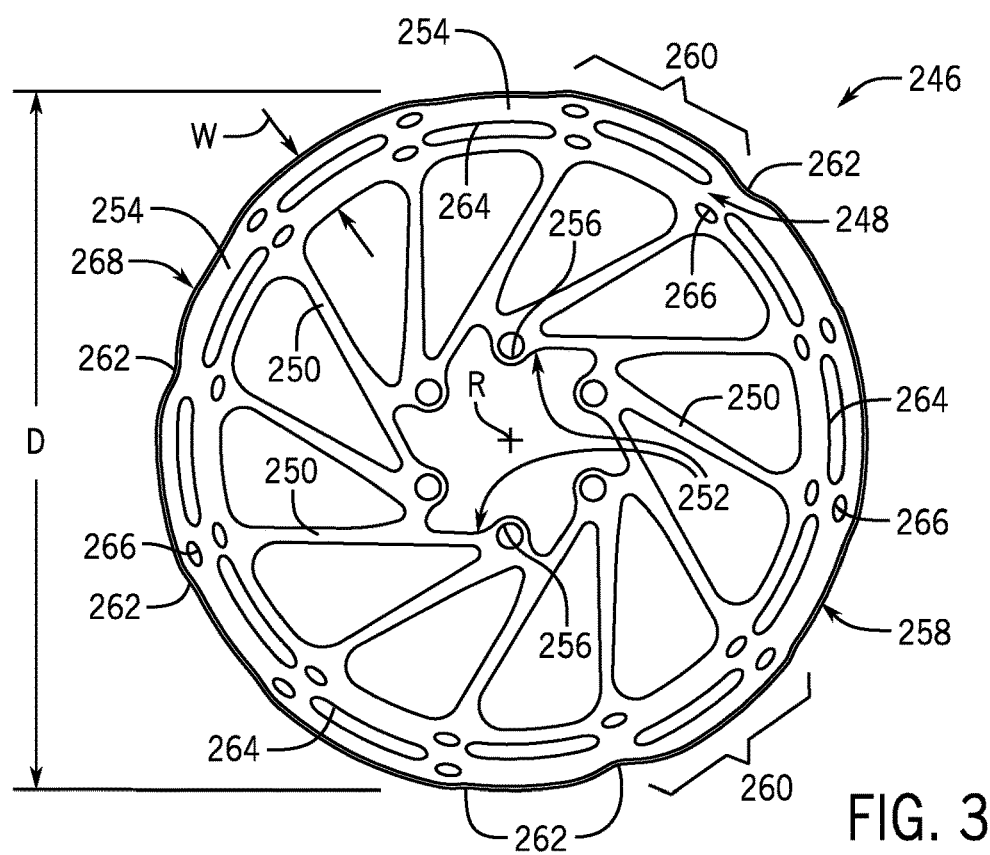
FIG. 3 is a side view of another example of a brake rotor, which may be constructed in accordance with the teachings of the present disclosure.

Instead, the peripheral edge 258 has a plurality of curved sections 260 around the perimeter that are not concentric about the axis R. The curved section 260 are separated or differentiated by depressions 262 in the peripheral edge 258. The depressions 262 have different placement and size in this example and are spaced apart around the circumference of the peripheral edge 258. The brake rotor 246 thus illustrates, in comparison to the brake rotor 146, that the circumferential contour of the brake rotors disclosed herein can also vary. As shown in FIG. 3, the brake rotor 246 also has a different number and arrangement of slots 264 and holes 266 of different size through the brake track 248 in comparison to the brake track 148 of the brake rotor 146.

Figure 6B:
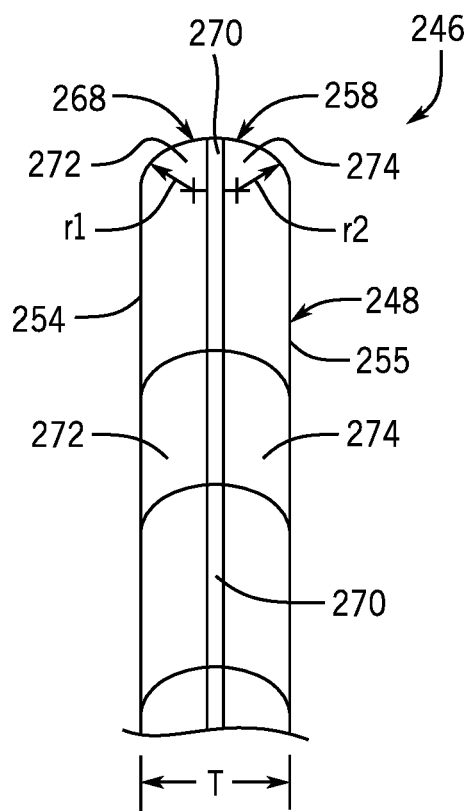
FIG. 6B is an enlarged cross-section view of the edge profile or surface portion taken from line 6B-6B of the brake rotor segment in FIG. 5.

Referring to FIGS. 6A and 6B, in this embodiment the brake rotor 246 is generally flat, which is typical of a brake rotor where the brake track 248, support members 250, and mounting section 252 are all made of one piece. The same may be true of the earlier described brake rotor 146. The thickness T of the brake rotor 246 is relatively thin compared to the diameter D, as is evident by the earlier noted ratios. For this reason, a common method of manufacturing the typical brake rotor is to start with a flat sheet substrate and to stamp the brake rotor geometry, such as that shown for the brake rotors 146 and 246 illustrated in FIGS. 2 and 3, from the sheet. Alternatively, the brake rotors may be produced by water cutting or laser cutting the rotor shape from a sheet substrate, and/or by using other machining techniques. These processes yield a brake rotor with a radially outermost, or peripheral, edge that has an edge profile across the thickness T that is substantially perpendicular or square to the opposed surfaces of the rotor. Variations in stamping or other machining techniques may result in some draft or small tolerance variation across the thickness on the brake rotor and may also result in an outer edge surface that is sharper adjacent one side than adjacent the other side of the rotor. However, the typical outer edge surface is still substantially square to the brake rotor friction surfaces.

As depicted in FIG. 6B, the brake rotor 246 has an outer edge surface 268 that has been shaped or contoured in accordance with the teachings of the present disclosure. For example, the shaped or contoured outer edge surface 268 may include transition sections. In this example, the edge surface 268 comprises a short flat central section 270 between transition sections, or transitions, configured as two flanking rounded corner sections 272, 274 transitioning from the edge surface to the flat sides or friction surfaces 254, 255 of the brake track 248. The radius of each of the rounded corners 272, 274 is slightly less than half the thickness T of the brake rotor and the origin location of the radii r1, r2 are not located at the same position. This leaves the short flat section 270 between the two rounded corners 272, 274. The transition sections may be configured the same or differently. In one example, the radius of each rounded corner can be the same. In another example, the radii can be different. The gradual progression through the outer edge surface between the flat section 270 and the rounded corners 272, 274 of the transition and between the rounded corners of the transition and the surfaces 254, 255 of the brake track 248 can aid in eliminating or substantially reducing the prominence of sharp angular transition corners at the outer edge surface of the brake rotor 246.

The transition sections 272, 274 may also include different curves and/or shapes providing for the transition. For example, one transition section may be curved, with a radius as described above, and the other transition section may include a chamfer or straight section of outer edge. The transition section may also include combinations of curves and/or profiles. For example, the transition section might include a portion curved according to a first radius disposed between one or more other sections having a different radius. As described herein, any of the transition sections may be combined with any of the other transition sections to create a brake rotor including any combination of transition sections as described herein.

FIG. 7 shows a cross-section of another example of a brake rotor 346 constructed in accordance with the teachings of the present disclosure. In this example, the brake rotor 346 has a brake track 348 with a thickness T between opposed friction surfaces 354, 355. The brake rotor 346 has a peripheral edge 358 across the thickness T that has with an edge surface 368 having a central flat section 370 between two flanking transition sections, provided as angled, large chamfers 372. A height H of the chamfers 372 is less than the thickness T of the brake rotor 346. A depth 'd1' of the chamfers in the thickness direction of the brake rotor 346 is less than 45% of the thickness T of the brake rotor. The section of the transition between the friction surfaces 354, 355 of the brake track 348 and the chamfers 372, and between the chamfers and the flat section 370, are substantially abrupt angular changes, with no additional curvature. However, the blunt or obtuse angles at these transition points, and the flat chamfers 372 and flat section 370 can aid in eliminating or substantially reducing the prominence of sharp angular transition corners at the peripheral edge of the brake rotor 346.

FIG. 8 shows a cross-section of another example of a brake rotor 446 constructed in accordance with the teachings of the present disclosure. In this example, the brake rotor 446 has a brake track 448 with a thickness T between opposed friction surfaces 454, 455. The brake rotor 446 has a peripheral edge 458 with an edge surface 468 across the thickness T. In this example, the transition sections are integrated with the edge surface, with both the edge surface and the transition sections having a same curve, provided as a full rounded or semi-circular shape between the two friction surfaces 454, 455. A radius 'r3' of the rounded surface is half the thickness T of the brake rotor 446. The changeover on the surfaces between the friction surfaces 454, 455 of the brake track 448 and the curved or rounded edge surface 468 are substantially smooth and gradual, assuming the surface is precisely centered on the edge surface 468. This is because the tangency at the transition points is parallel to the friction surfaces 454, 455. There are no discernable edges on the edge surface 468. Manufacturing variances and/or tolerances, such as those caused by tool wear, may result in an embodiment having a minimal edge on one side 454, 455, the other side, or both, that are less than perfectly tangent. This may be true for any of the various edge surface embodiments disclosed herein. However, such an embodiment would still provide for a shaped peripheral edge surface as is disclosed herein. The rounded or semi-circular peripheral edge 458 can aid in eliminating or substantially reducing the prominence of sharp angular transition corners at the peripheral edge of the brake rotor 446.

FIG. 9 shows a cross-section of another example of a brake rotor 546 constructed in accordance with the teachings of the present disclosure. In this example, the brake rotor 546 has a brake track 548 with a thickness T between opposed friction surfaces 554, 555. The brake rotor 546 has a peripheral edge 558 across the thickness T that is similar in some respects to the peripheral edge 358 to the brake rotor 346 in FIG. 7. In this example, the edge surface 568 has a central curved or rounded section 570 of the edge surface between two flanking, angled, tangent sections or chamfers 572 of the transition sections. A height H of the chamfers 572 may again be less than the thickness T of the brake rotor 546. A depth 'd2' of the chamfers in the thickness direction of the brake rotor 546 may again be less than 45% of the thickness T of the brake rotor. The curved rounded central section may have a constant radius or may have an alternate curve profile. The surface changeovers of the transition section between the friction surfaces 554, 555 of the brake track 548 and the chamfers 572 are the same as those in FIG. 7 for the brake rotor 346 and thus are substantially abrupt angular transitions with no additional chamfer or rounds. The surface changeovers of the transition section between the chamfers 572 and the rounded central section 570 are smooth and gradual with no discernable sharp angular transition edge. The blunt or obtuse angles at the transition points and the gradual surface changeovers at central transition points can aid in eliminating or substantially reducing the prominence of sharp angular transition corners at the peripheral edge of the brake rotor 546.

FIG. 10 shows a cross-section of another example of a brake rotor 646 constructed in accordance with the teachings of the present disclosure. In this example, the brake rotor 646 has a brake track 648 with a thickness T between opposed friction surfaces 654, 655. The brake rotor 646 has a peripheral edge 658 across the thickness T that is a reverse of the peripheral edge 558 on the brake rotor 546 in FIG. 9. In this example, the edge surface 668 has a central flat section 670 between two flanking, curved or rounded sections 672 of the transition sections. The curve sections 672 may have a constant radius or curvature or may have an alternate curve profile. The surface changeover of the transition section between the central flat section 670 and the curved sections 672 are substantially abrupt angular transitions with no additional chamfer or rounds. The surface changeover of the transition section between the rounded or curved sections 672 and the friction surfaces 654, 655 on the brake track 648 are smooth and gradual with no discernable sharp angular transition edge. This is because the tangency of the curvature on these sections at the transition points is parallel to the friction surfaces 654, 655. The blunt or obtuse angles at the sharp transition points and the gradual rounded transition points at the friction surfaces 654, 655 can aid in eliminating or substantially reducing the prominence of sharp angular transition corners at the peripheral edge of the brake rotor 646.

In the embodiments of FIGS. 6B, 7, 9, and 10, it may be possible or desirable to make any blunt but sharp transition points with a rounded surface transition so as to create surface tangents on these sections that are parallel to the adjacent sections. This will create peripheral edge profiles that look similar to those described for FIGS. 6B, 7, 9, and 10, but that also eliminate the stark, though blunt or obtuse, sharp edge transitions.

Figure 11:
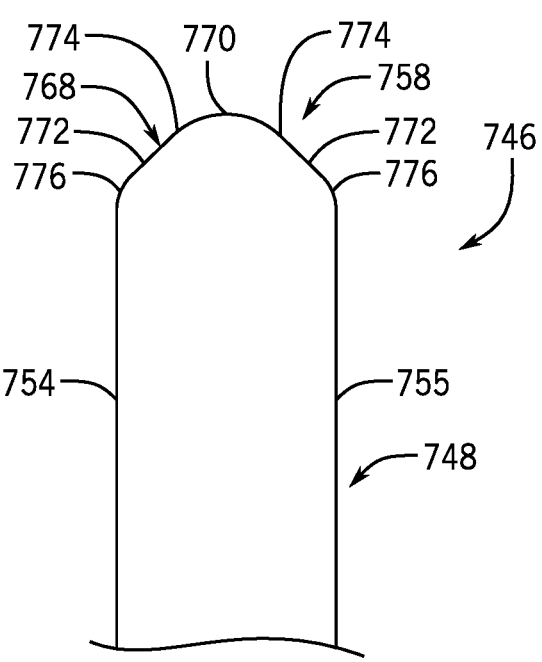
FIG. 11 is an enlarged cross-section view of another example of a peripheral surface profile for a brake rotor constructed in accordance with the teachings of the present disclosure.

To illustrate, FIG. 11 shows a cross-section of another example of a brake rotor 746 constructed in accordance with the teachings of the present disclosure, and which is similar to the brake rotor 546 of FIG. 9. In this example, the brake rotor 746 has a brake track 748 with a thickness T between opposed friction surfaces 754, 755. The brake rotor 746 has a peripheral edge 758 having a profile across the thickness T. In this example, an edge surface 768 has a central curved or rounded section 770 between two transition sections having flanking, angled, tangent sections or chamfers 772. However, in this example, each of the surface changeovers at the transition points 774 between the central section 770 and the chamfers 772 is rounded or curved and each of the surface changeovers at the transition points 776 between the between the friction surfaces 754, 755 of the brake track 748 and the chamfers 772 is also rounded or curved. The smooth, gradual, curved points can aid in eliminating or substantially reducing the prominence of sharp angular transition corners at the peripheral edge of the brake rotor 746.

Figure 12:
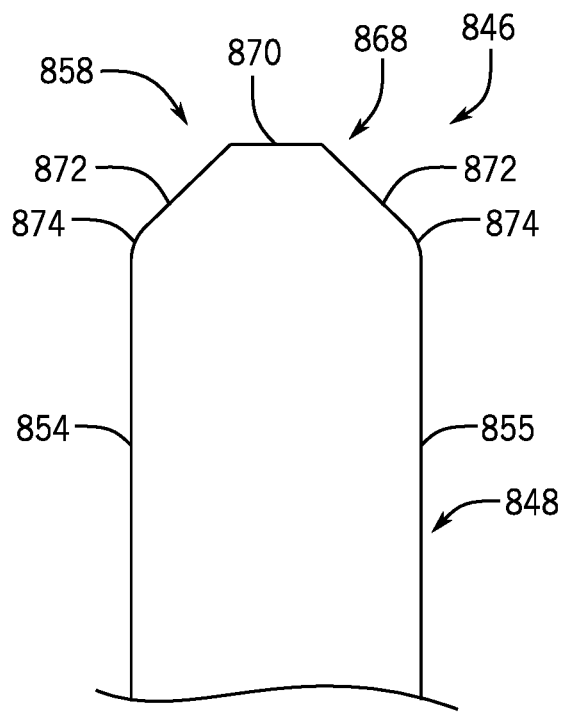
FIG. 12 is an enlarged cross-section view of another example of a peripheral surface profile for a brake rotor constructed in accordance with the teachings of the present disclosure.

FIG. 12 shows a cross-section of another example of a brake rotor 846 constructed in accordance with the teachings of the present disclosure, and which is somewhat similar to the brake rotor 346 of FIG. 7. In this example, the brake rotor 846 has a brake track 848 with a thickness T between opposed friction surfaces 854, 855. The brake rotor 846 has a peripheral edge 858 having a profile across the thickness T. An edge surface 868 has a central flat section 870 between two flanking transition sections having angled, large chamfers 872. The surface changeovers at transition points 874 between the friction surfaces 854, 855 of the brake track 848 and the chamfers 872 are rounded or curved in this example. The tangent at the transition 874 may be parallel to the friction surfaces 854, 855 to eliminate any edge or sharpness therein. The surface changeovers between the chamfers 872 and the flat central section 870 are substantially sharp with no additional curvature. However, the blunt or obtuse angles at these transition points, and the curved transition section portions 874, can aid in eliminating or substantially reducing the prominence of sharp angular transition corners at the peripheral edge of the brake rotor 846.

Figure 13:
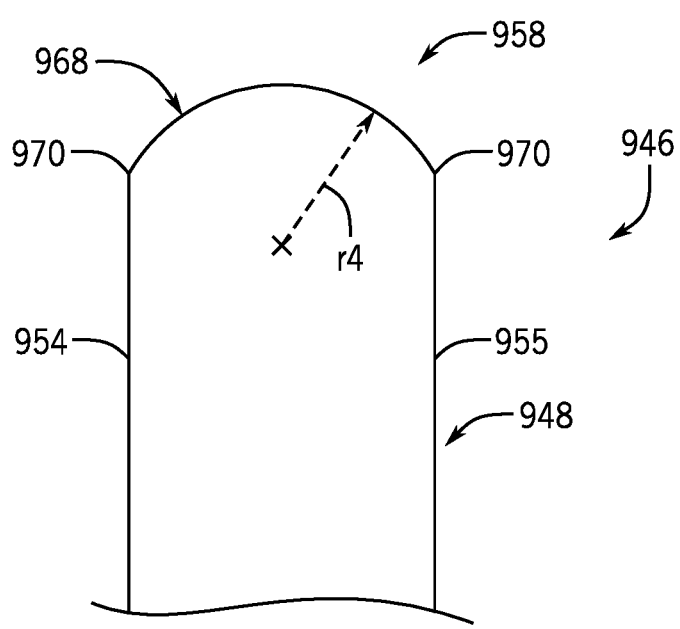
FIG. 13 is an enlarged cross-section view of another example of a peripheral surface profile for a brake rotor constructed in accordance with the teachings of the present disclosure.

FIG. 13 shows a cross-section of another example of a brake rotor 946 constructed in accordance with the teachings of the present disclosure, and which is similar to the brake rotor 446 of FIG. 8. In this example, the brake rotor 946 has a brake track 948 with a thickness T between opposed friction surfaces 954, 955. The brake rotor 946 has a peripheral edge 958 having a profile across the thickness T. In this example, an edge surface 968 is integrated with a similar curve as the transition sections and all are provided as a rounded or arc shaped between the two friction surfaces 954, 955. The edge surface 968 can be centered or symmetrical on the brake rotor 946, if desired. A radius 'r4' of the rounded surface 968 in this example is greater than the thickness T of the brake rotor 946. Thus, the surface changeover at transition points 970 between the friction surfaces 954, 955 of the brake track 948 and the curved or rounded edge surface 968 are not a parallel tangency to the friction surfaces. There is thus a discernable edge at the transition points 970. In an embodiment, the surface changeover can be rounded to eliminate the discernable edge. The rounded or arc shaped edge surface 968 can aid in eliminating or substantially reducing the prominence of sharp angular transition corners at the peripheral edge of the brake rotor 946.

The disclosed peripheral edge profiles of a brake rotor may be manufactured in a variety of ways. In an embodiment, a method for manufacturing a rotor involves forming a transition section of a peripheral edge that forms a profile that is non-perpendicular to the friction surfaces in the axial direction. For example, material may be removed from the peripheral edge of the rotor during manufacture so as to provide the non-perpendicular profile. Material may be removed using milling, grinding, or other processes or techniques resulting in the non-perpendicular axial profile. If the brake rotor has a round or circular outer circumferential periphery, the rotor itself may be attached to a rotating machine such as a lathe or mill. An appropriate shaped tool may be employed to cut or form the desired edge surface shape or contour in or on the peripheral edge of the rotor. For example, the tool shape may have the negative form of any of the foregoing edge surface shapes or contours. The tool can be configured and utilized to remove material from the rotor peripheral edge to form the peripheral edge surface shapes and contours. Any of the above-described edge surfaces may be formed on a circular brake rotor.

However, brake rotors may have a non-circular or non-round outer periphery, as shown in FIGS. 2 and 3. In these types of brake rotors, a different manufacturing method may be considered. In an embodiment, material is removed from eccentric regions of the outer peripheral edge, such as notches, cutouts, and/or depressions, to generate the axial profile of the transition sections within said eccentric regions. In an embodiment, the entirety of the periphery of a non-round brake rotor has material removed to generate transition sections having a contour that is non-perpendicular to the friction surfaces.

Figure 16:
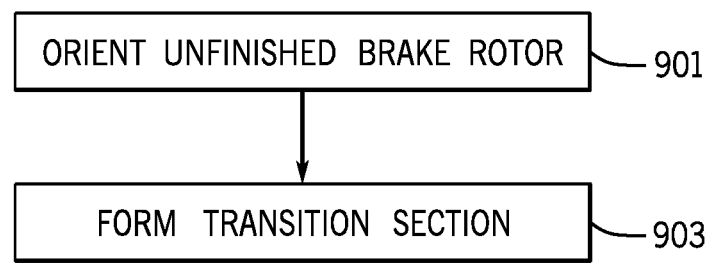
FIG. 16 illustrates a flow chart diagram of a method of manufacturing a brake rotor.

FIG. 16 illustrates a method of manufacturing a rotor. The method involves orienting an unfinished brake rotor (Act 901). The orienting may involve any action and/or activity that positions an unfinished brake rotor such that the transition section of the peripheral edge of the brake rotor is accessible by a manufacturing apparatus provided to form the brake rotor. An unfinished brake rotor may be a stamped or cut brake rotor at a stage in the manufacturing process that includes finished features, but includes at least one sharp angular transition at the peripheral edge. An unfinished brake rotor may also be a rotor blank or thin sheet of material with no discernable rotor features yet formed. An unfinished brake rotor may also be a brake rotor at any stage of feature creation between these described stages.

The unfinished rotor has at least one transition section formed (Act 902). The transition section is formed by any technique and/or process. For example, the transition section may be formed by bending, extruding, and/or otherwise manipulating the material into a transition section that eliminates or substantially reduces the prominence of sharp angular transition corners at the peripheral edge, such as through stamping or other applications of pressure and tooling to the material of the brake rotor. In an embodiment, the transition section that eliminates or substantially reduces the prominence of sharp angular transition corners at the peripheral edge is formed through the removal of material, such as by milling and/or grinding.

Figure 14:
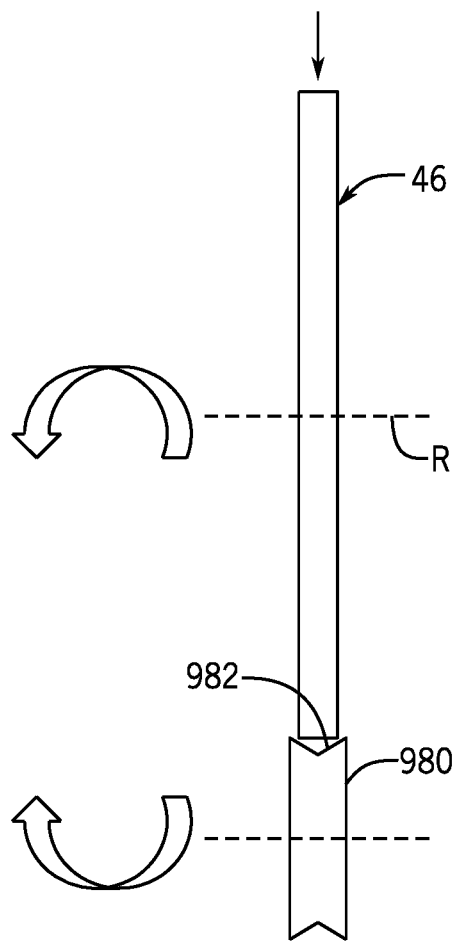
FIG. 14 is a diagram illustrating one example of a method of shaping a profile of a peripheral surface of a brake rotor such as those depicted in FIGS. 6B-13.

FIG. 14 shows one example, in a simplified diagram form, of the manufacturing method wherein a specialized cutting tool 980 is used to form a peripheral edge of a brake rotor by removing material from the brake rotor. The cutting tool 980 can have a cutting head 982, which may have a cross-section that matches or negatively mirrors the desired peripheral edge profile, shape, or contour of the edge surface to be created on the outer periphery of the brake rotor 46. The cutting tool 980 may be rotated at a high speed. The brake rotor 46 may be fixed on a fixture (not shown) configured to slowly rotate the rotor about its rotation axis R. The peripheral edge of the brake rotor 46 and the cutting tool 980 may be disposed adjacent one another as shown in FIG. 14. The brake rotor may be rotated manually or automatically via the machine or fixture. The fixture and the brake rotor 46 can be constructed so that the rotor will drop via gravity toward the cutting tool 980. This can ensure a stable, consistent load during cutting. In this way, the outer peripheral edge of a non-circular brake rotor may also be shaped, for example, to create any of the embodiments shown in FIGS. 6B-13. Alternatively, the brake rotor 46 may be held stationary by the fixture and the rotating cutting tool 980 may be programmed to follow the non-circular outer periphery of the rotor, similar to a CNC machine or the like.

Figure 15:
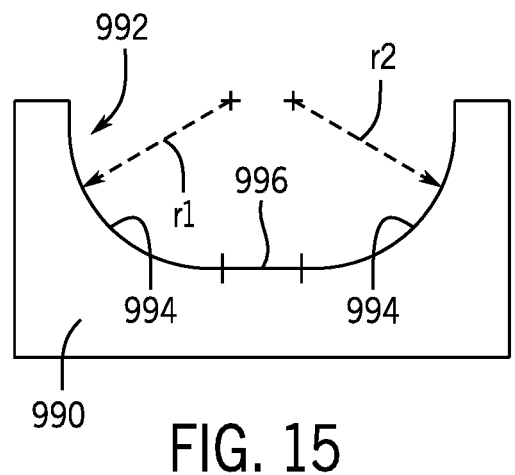
FIG. 15 is a diagram illustrating one example of a cutting head on a tool of the diagram in FIG. 14 and for shaping the profile of the peripheral surface of a brake rotor such as that depicted in FIG. 6B.

FIG. 15 shows one example of a tool 990 with a cutting head 992 that is shaped to form the profile of the peripheral edge 258 of the brake rotor 246 depicted in FIGS. 5, 6A, and 6B. In this example, the cutting head 992 is shaped to define two curved, spaced apart rounded segments 994 that are symmetrically spaced apart across the tool head. The radii of the two curved segments 994 in this example are the same but are not concentric with each other. Thus, the tool cutting head 992 also has a flat region 996 between the two curved segments 994. The curved segments 994 cut and form the rounded corners 272, 274 of the transition section on the peripheral edge. The flat region 996 cuts and forms the flat section on the edge surface 268. As shown in FIG. 15, the radii 'r1' and 'r2' of the curved segments 994 on the cutting tool can each be, for example, 0.816 mm. The total width across the cutting head 992 can be about 2.213 mm and the flat region 996 can be about 0.462 mm. If the tool 990 forms a perfectly symmetrical cut on the edge surface 268 of the brake rotor 246, these same dimensions would apply to the rounded corners 272, 274 and the flat section 270 on the edge surface. However, manufacturing and tolerance variation, and part movement during manufacturing, may result in a peripheral edge with dimensions that are not precisely symmetrical. In one specific example, where the thickness T of the brake rotor 246 is 2.213 mm, the radius 'r1' of one rounded corner 272 may be 0.790 mm and the radius 'r2' of the other rounded corner may be 0.819 mm, whereas the central flat section may be 0.326 mm.

The brake rotor and edge surface embodiments disclosed and described herein may provide for better handling of brake rotors, both in assembly and use.

Although certain brake rotors, peripheral edges, rotor edge surface and transition profiles, shapes, or contours, and manufacturing methods have been described herein in accordance with the teachings of the present disclosure, the scope of coverage of this patent is not limited thereto. On the contrary, as will become evident to those having ordinary skill in the art upon reading this disclosure, this patent covers all embodiments of the teachings of the disclosure, and equivalents thereof, that fairly fall within the scope of permissible equivalents.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination.

Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A brake rotor for a bicycle comprising:
 a circumferential brake track disposed about an axis of rotation of the brake rotor, the circumferential brake track comprising a first surface and a second surface that face axially outward away from one another and that are on axially opposed sides of the brake rotor, the two surfaces defining a thickness therebetween; and
 an outer peripheral edge circumferentially around the brake rotor, the outer peripheral edge comprising:
  an edge surface facing radially outward on the outer peripheral edge, and
  a transition between each of the two surfaces and the edge surface;
 wherein at least a portion of the transition of the outer peripheral edge is not perpendicular to the two surfaces in an axial direction of the brake rotor, and a central portion of the edge surface is rounded or curved in the axial direction between the transitions of the two surfaces and the edge surface.

2. The brake rotor of claim 1, further comprising:
 a plurality of support members; and
 a mounting section,
 wherein the support members extend between and connect the mounting section and the brake track to one another.

3. The brake rotor of claim 2, wherein the brake rotor, including the brake track, the support members, and the mounting section, is substantially flat.

4. The brake rotor of claim 1, wherein the outer peripheral edge is non-circular.

5. The brake rotor of claim 4, wherein the outer peripheral edge includes one or more notches or depressions formed therein, the notches or depressions each having a contour that is not concentric with the axis of rotation.

6. The brake rotor of claim 4, wherein the outer peripheral edge includes one or more eccentricities including the transition.

7. The brake rotor of claim 1, wherein the brake rotor has a diameter, and wherein a ratio of the diameter to the thickness is between 48 and 140.

8. The brake rotor of claim 7, wherein the brake track has a width in a radial direction relative to the axis of rotation of between 10 mm and 18 mm.

9. The brake rotor of claim 1, wherein the brake track has a width in a radial direction relative to the axis of rotation of between 10 mm and 18 mm.

10. The brake rotor of claim 1, wherein the brake track is the radially outermost part of the brake rotor, wherein the two surfaces are the opposed axial sides on the brake track, and wherein the peripheral edge is on a radially outermost portion of the brake track.

11. The brake rotor of claim 1, wherein the portion of the transition of the outer peripheral edge includes a curved section in the axial direction.

12. The brake rotor of claim 1, wherein the portion of the transition of the outer peripheral edge includes a chamfer in the axial direction.

13. The brake rotor of claim 1, wherein the rounded or curved edge surface has a constant radius.

14. The brake rotor of claim 13, wherein the constant radius is half the thickness between the two surfaces.

15. The brake rotor of claim 13, wherein the constant radius is greater than half the thickness between the two surfaces.

16. The brake rotor of claim 1, wherein the edge surface includes a central section disposed between two flanking sections in the axial direction, and wherein either the central section or the two flanking sections comprise the portion of the transition of the outer peripheral edge.

17. The brake rotor of claim 1, wherein the edge surface includes a central flat section between two flanking curved sections in the axial direction.

18. The brake rotor of claim 17, wherein the curved sections are constructed and arranged so that tangents thereto at each of the transitions are parallel to the two surfaces.

19. The brake rotor of claim 1, wherein the edge surface includes a central curved section between two flanking chamfers in the axial direction.

20. The brake rotor of claim 19, wherein the transitions are between the two flanking chamfers and the two surfaces and are rounded.

21. The brake rotor of claim 1, wherein the edge surface includes a central flat section between two flanking chamfers in the axial direction.

22. The brake rotor of claim 1, wherein the edge surface is a curved rounded central section having a constant radius.

* * * * *